(12) United States Patent
Kintzinger et al.

(10) Patent No.: US 9,931,775 B2
(45) Date of Patent: Apr. 3, 2018

(54) WEIGHT COMPENSATED MOLDING MACHINE

(71) Applicant: Husky Injection Molding Systems Ltd., Bolton (CA)

(72) Inventors: Rainer Kintzinger, Merzig (DE);
Christophe Halter, Selange (BE);
Pierre Glaesener, Bissen (LU)

(73) Assignee: HUSKY INJECTION MOLDING SYSTEMS LTD., Bolton, Ontario (CA)

( * ) Notice: Subject to any disclaimer, the term of this patent is extended or adjusted under 35 U.S.C. 154(b) by 398 days.

(21) Appl. No.: 14/782,945

(22) PCT Filed: Mar. 3, 2014

(86) PCT No.: PCT/CA2014/050163
§ 371 (c)(1),
(2) Date: Oct. 7, 2015

(87) PCT Pub. No.: WO2014/169379
PCT Pub. Date: Oct. 23, 2014

(65) Prior Publication Data
US 2016/0067897 A1    Mar. 10, 2016

Related U.S. Application Data

(60) Provisional application No. 61/812,439, filed on Apr. 16, 2013.

(51) Int. Cl.
*B29C 45/17*    (2006.01)
*B29C 45/40*    (2006.01)
*B29C 45/26*    (2006.01)

(52) U.S. Cl.
CPC ...... *B29C 45/2602* (2013.01); *B29C 45/4005* (2013.01); *B29C 45/1742* (2013.01); *B29C 45/1761* (2013.01); *B29C 45/2675* (2013.01); *B29C 2045/4052* (2013.01)

(58) Field of Classification Search
CPC ............ B29C 45/1742; B29C 45/1761; B29C 45/2602; B29C 45/2675; B29C 45/4005; B29C 2045/4052
See application file for complete search history.

(56) References Cited

U.S. PATENT DOCUMENTS

| | | | | |
|---|---|---|---|---|
| 4,984,980 A | * | 1/1991 | Ueno ................. | B29C 45/1761 164/341 |
| 5,249,951 A | * | 10/1993 | Leonhartsberger . | B29C 45/1761 100/258 A |
| 5,297,952 A | * | 3/1994 | Leonhartsberger . | B29C 45/1751 425/451.6 |
| 7,168,946 B2 | * | 1/2007 | Koike ................. | B29C 45/1761 100/258 A |

(Continued)

OTHER PUBLICATIONS

PCT International Search Report, Cuerrier, Pierre, dated May 13, 2014, 3 pages.

*Primary Examiner* — James P Mackey

(57) ABSTRACT

Wings are provided on mold components and linear ways are provided below these wings. A pad rides on each linear way below each wing. A force generator, such as a spring, is disposed between each wing and underlying pad. In this way the weight of the mold components is borne, at least in part, by the linear ways so that the weight on components that might otherwise sag is lessened.

16 Claims, 11 Drawing Sheets

(56) References Cited

Figure 1:
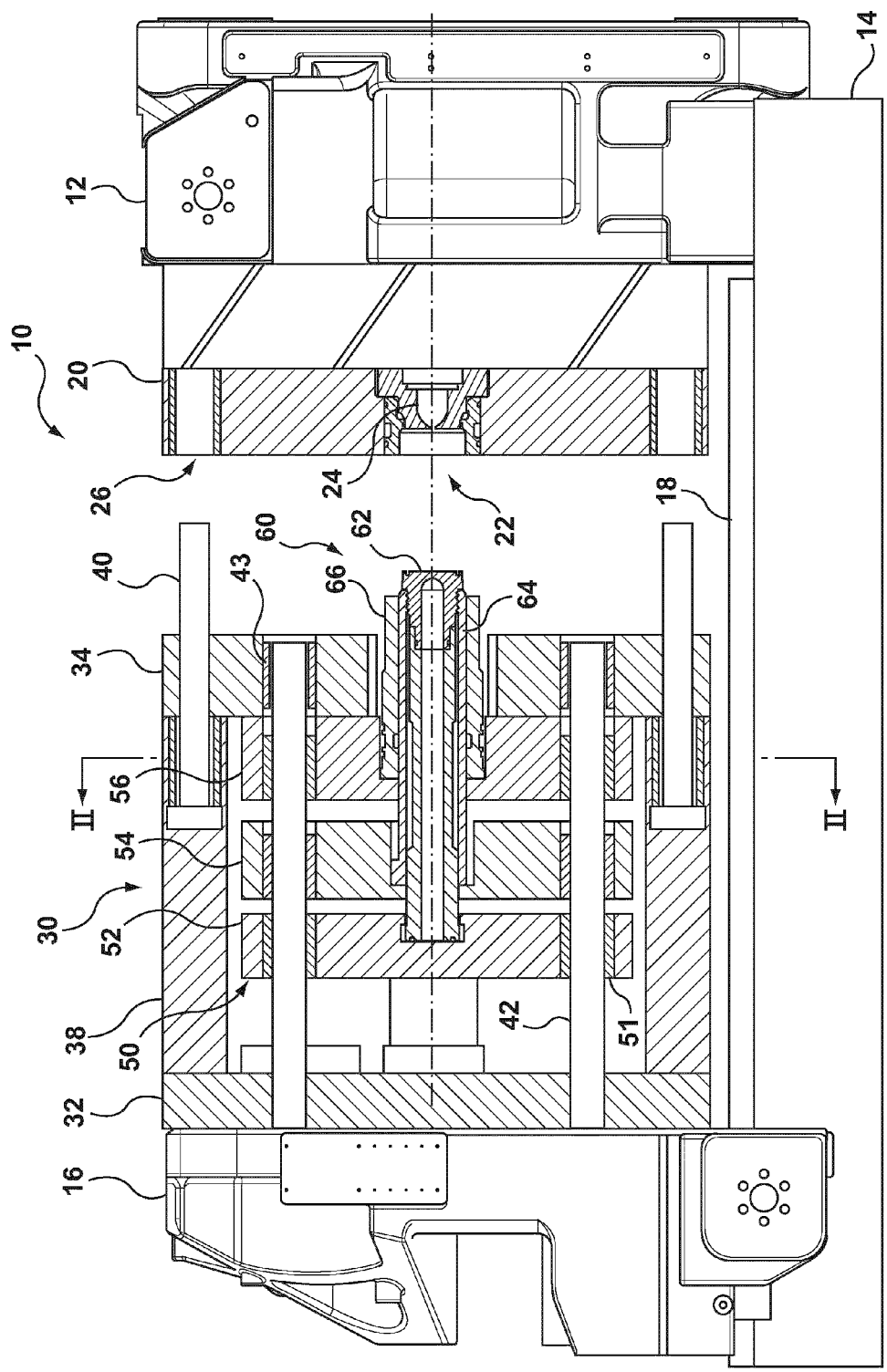

U.S. PATENT DOCUMENTS 8,043,083 B2 * 10/2011 Nishimura .......... B29C 45/1761
425/190
2005/0170038 A1 8/2005 Koike et al.

* cited by examiner

WEIGHT COMPENSATED MOLDING MACHINE

TECHNICAL FIELD

Non-Limiting embodiments disclosed herein generally relate to mold assemblies for a molding machine and to a molding machine.

BACKGROUND

Molding machines are heavy industrial machines: the replaceable mold assemblies for these machines can weigh upwards of fifty tonnes. Even with strong supports, the weight of moving parts of a molding machine can cause misalignments due to sagging. These misalignments can increase the wear on both the molding machine and the mold in the machine, as well as negatively affecting the quality of the produced parts.

An approach to compensate for sagging is described in U.S. Pat. No. 7,753,668 to Glaesener et al. issued Jul. 13, 2010. In Glaesener, the output of a level sensor is used by a controller to generate a control signal which varies the cylinder pressure of an anti-tilt actuator in order to compensate for sagging.

SUMMARY

Wings are provided on mold components and linear ways are provided below these wings. A pad rides on each linear way below each wing. A force generator, such as a spring, is disposed between each wing and underlying pad. In this way the weight of the suspended component is borne, at least in part, by the linear ways so that the weight on components that might otherwise sag is lessened.

In an aspect, there is provided a mold assembly for use in a molding machine comprising: an ejector box having a plurality of guides, said ejector box defining at least one ejector box linear way; a cassette having at least one cassette plate extending within said ejector box and supported on said guides, each cassette plate for supporting a mold piece, each cassette plate having at least one cassette plate support member extending over one said ejector box linear way; at least one pad riding on each said ejector box linear way such that there is a pad below each cassette plate support member; a force generator disposed between said cassette plate support member and said pad below said cassette plate support member.

In another aspect, there is provided a molding machine comprising: a moveable platen; an ejector box attached to said moveable platen, said ejector box having a plurality of guides; said ejector box having at least one ejector box linear way; a cassette having at least one cassette plate extending within said ejector box and supported on said guides, each cassette plate supporting a mold piece, each cassette plate having at least one cassette plate support extending over one said ejector box linear way; at least one pad riding on each said ejector box linear way such that there is a pad below each cassette plate support; a force generator disposed between said each cassette plate support and said pad below said each cassette plate support.

In a further aspect, there is provided a molding machine comprising: a bed having a first linear way and a second linear way; a moveable platen moveably supported on said bed; a fixed platen fixed to said bed; an ejector box affixed to said moveable platen, said ejector box having a first wing and an opposed second wing; a first pad riding on said first linear way and a second pad riding on said second linear way; an outer end of said first wing disposed above said first pad and an outer end of said second wing disposed above said second pad; at least one spring disposed between said outer end of first wing and said first pad and at least one spring disposed between said outer end of said second wing and said second pad; one of said outer end of said first wing and said first pad providing a key and another of said outer end of said first wing and said first pad providing a keyway so that said first wing may move upwardly away from first pad and said first pad is constrained to move along said first linear way with said first wing; one of said outer end of said second wing and said second pad providing a key and another of said outer end of said second wing and said second pad providing a keyway so that said second wing may move upwardly away from second pad and said second pad is constrained to move along said second linear way with said second wing.

In yet a further aspect, there is provided a molding machine comprising: a suspended component having a first wing and an opposed second wing projecting outwardly from opposed sides of said suspended component; a first linear way provided below said first wing; a second linear way provided below said second wing; a first pad slidably received on said first linear way below said first wing; a second pad slidably received on said second linear way below said second wing; a force generator disposed between said first wing and said first pad; and a force generator disposed between said second wing and said second pad.

These and other aspects and features of non-limiting embodiments will now become apparent to those skilled in the art upon review of the following description of specific non-limiting embodiments in conjunction with the accompanying drawings.

DETAILED DESCRIPTION OF THE DRAWINGS

Figure 2:
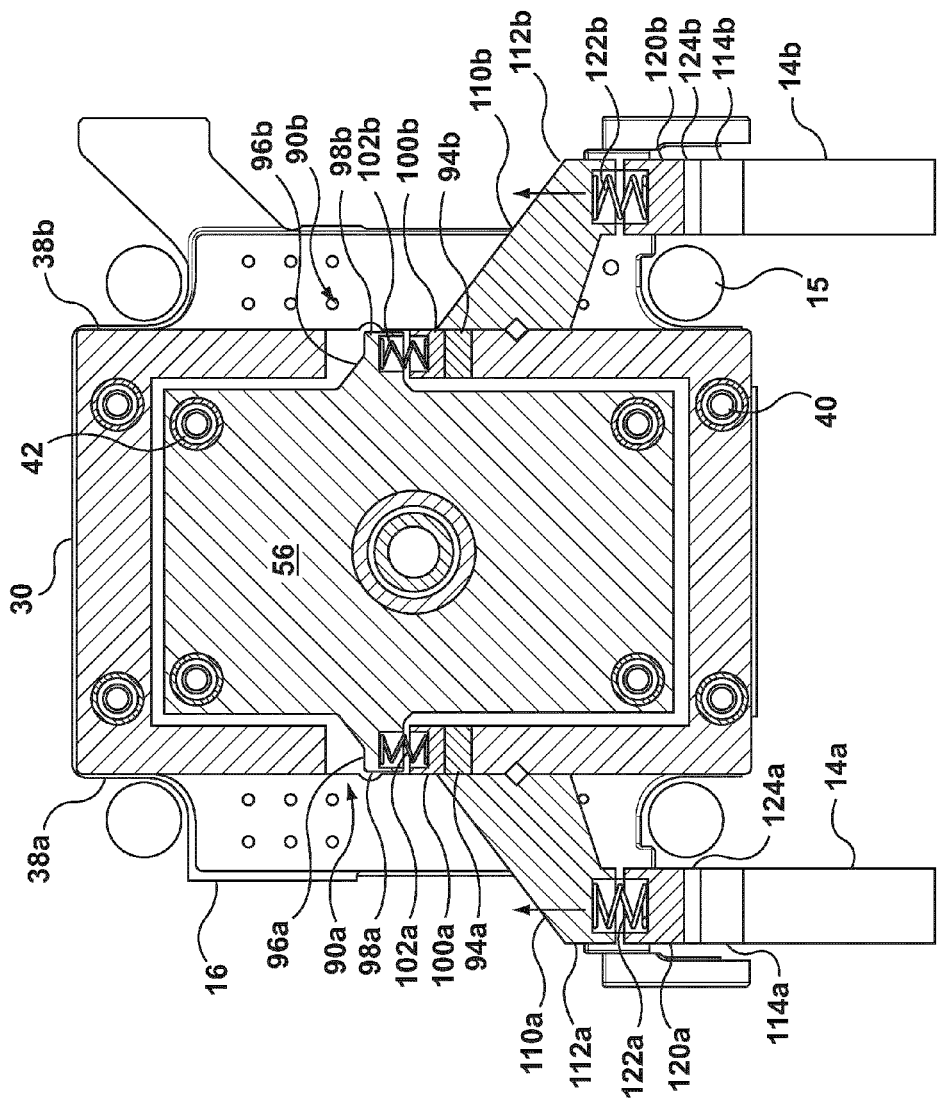
Figure 3:
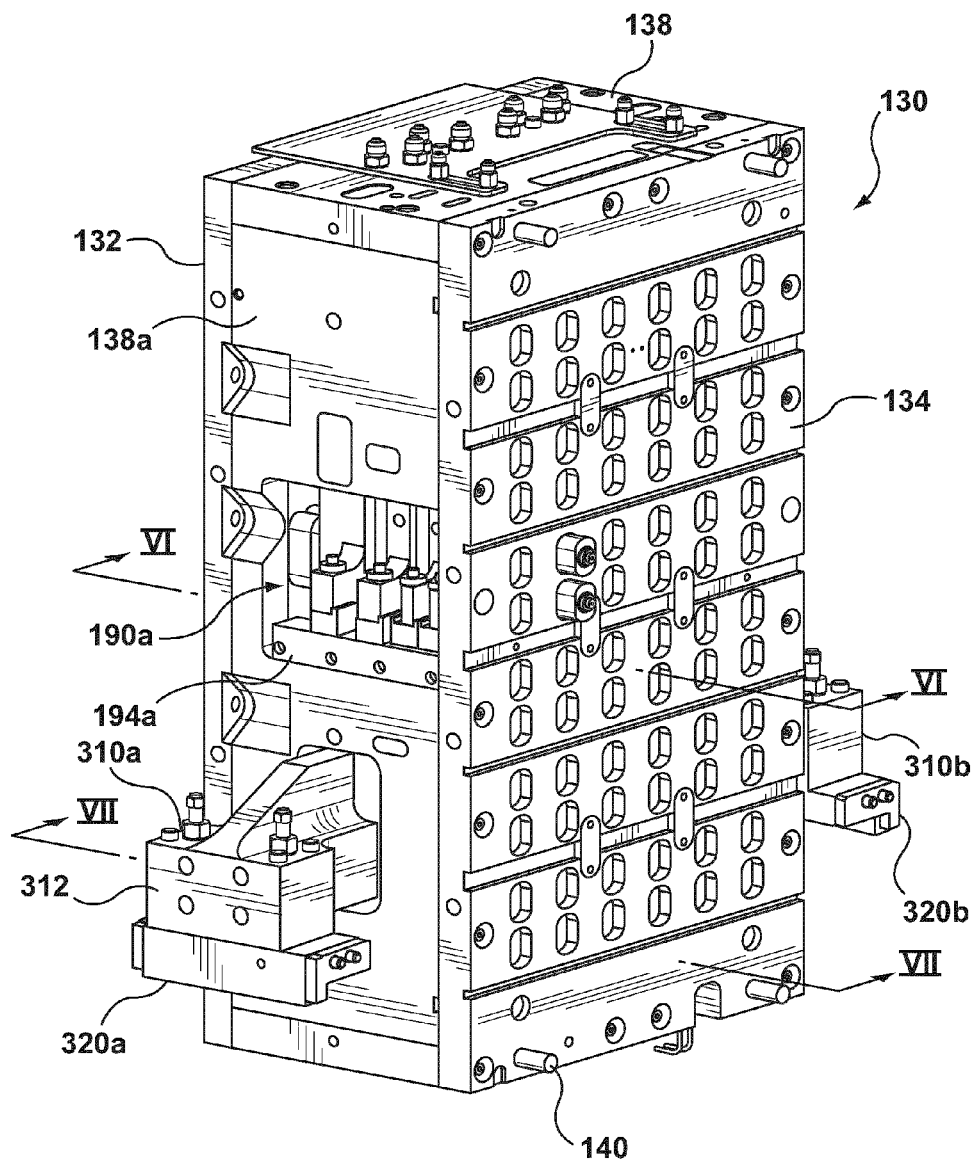
Figure 4:
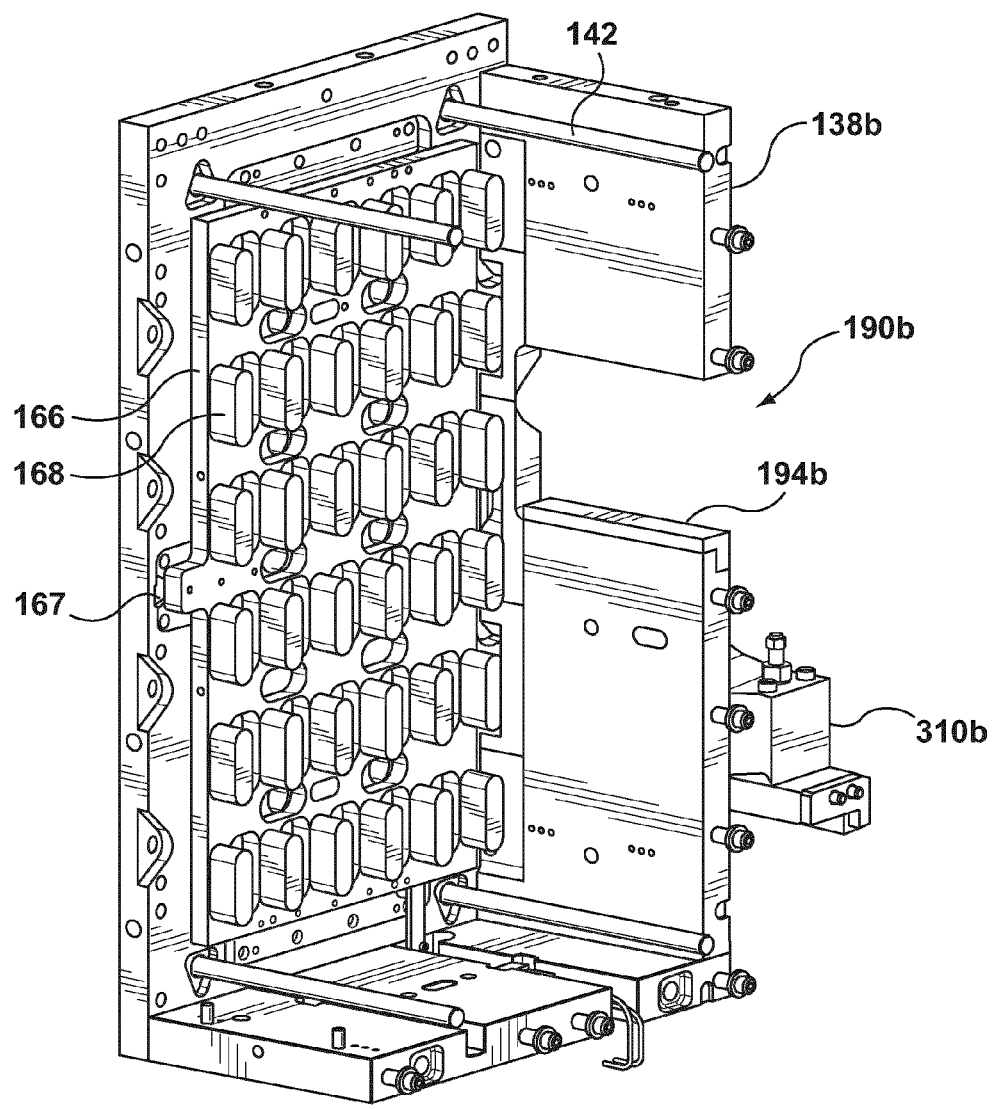
Figure 5:
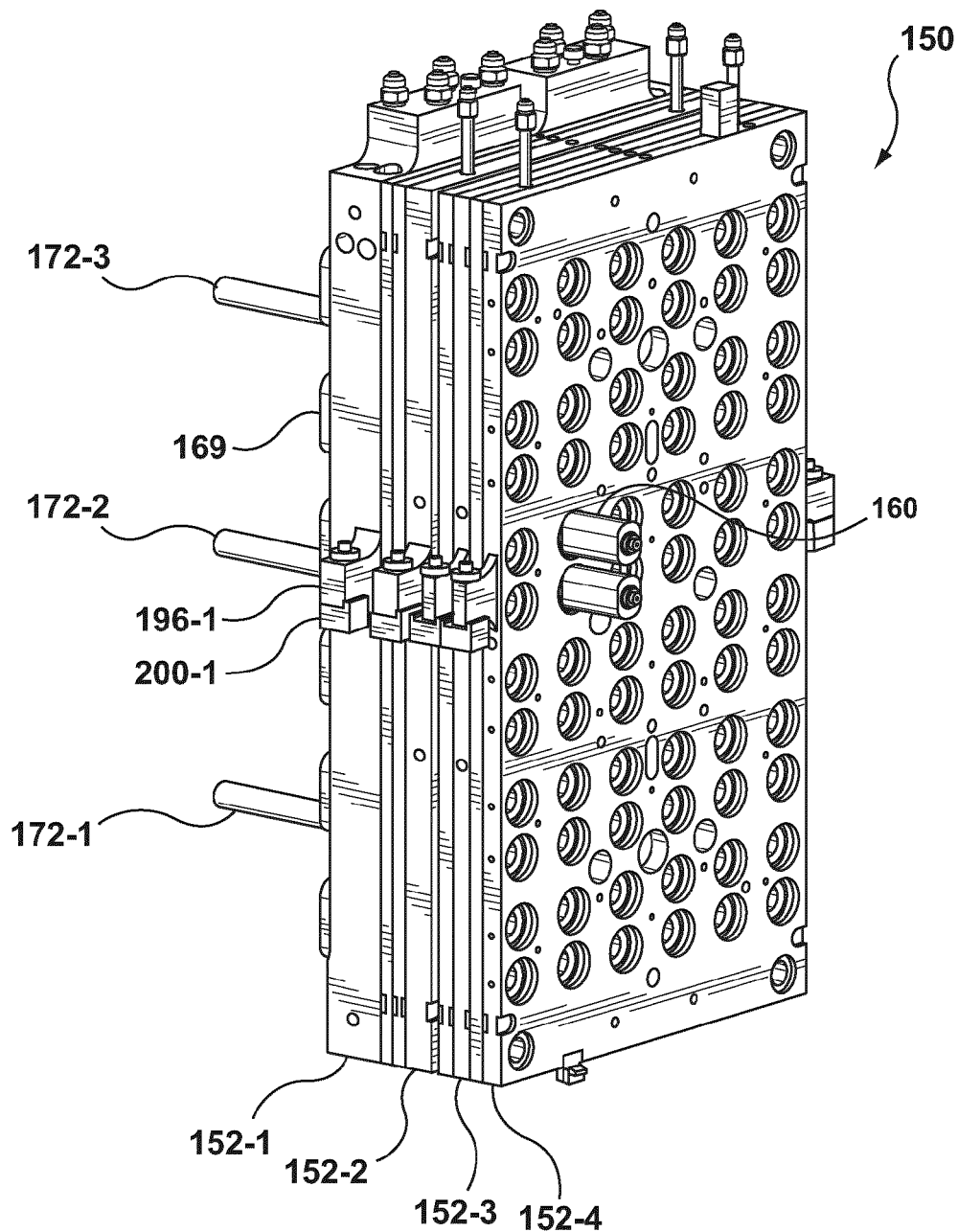
Figure 6:
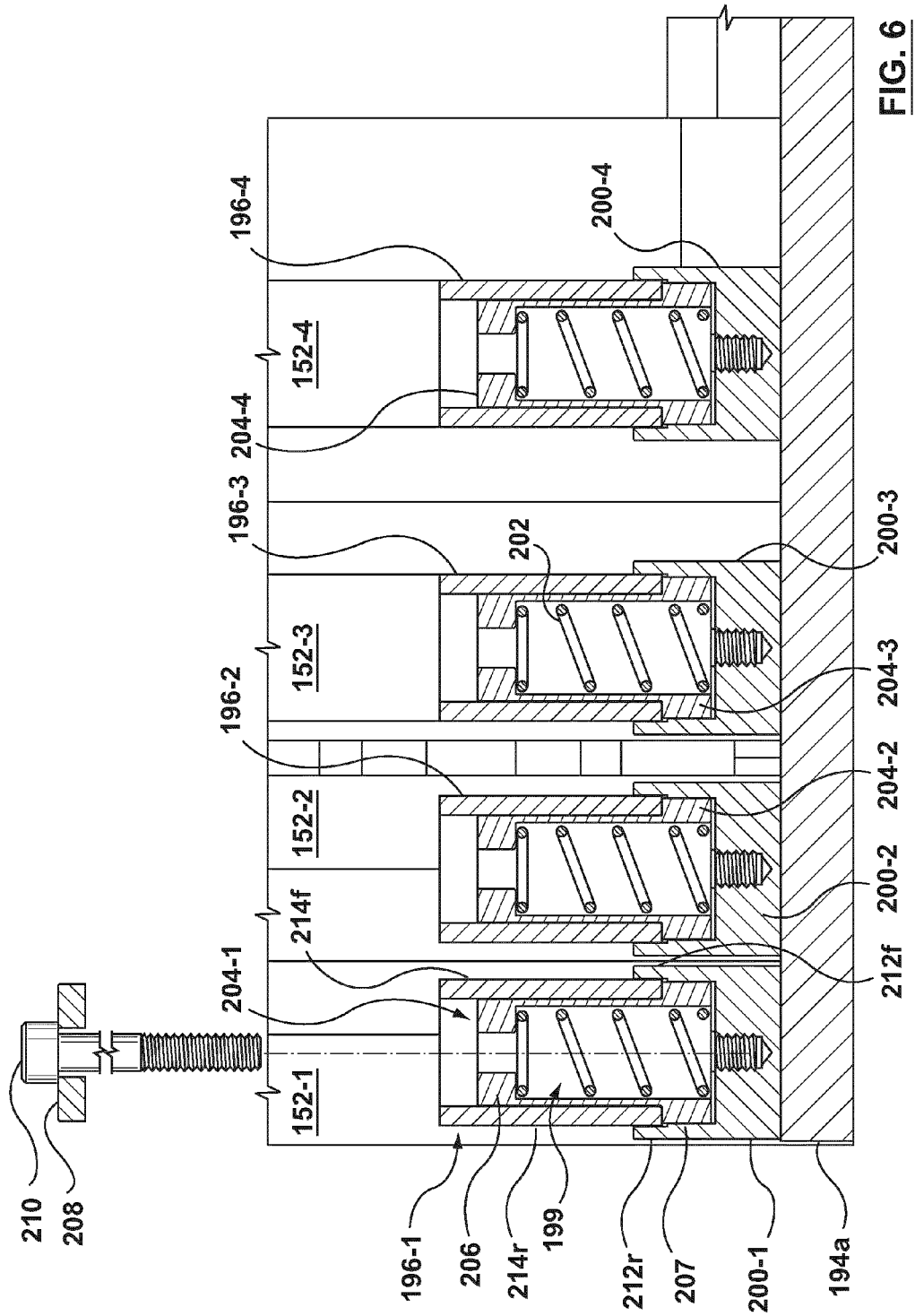
Figure 7:
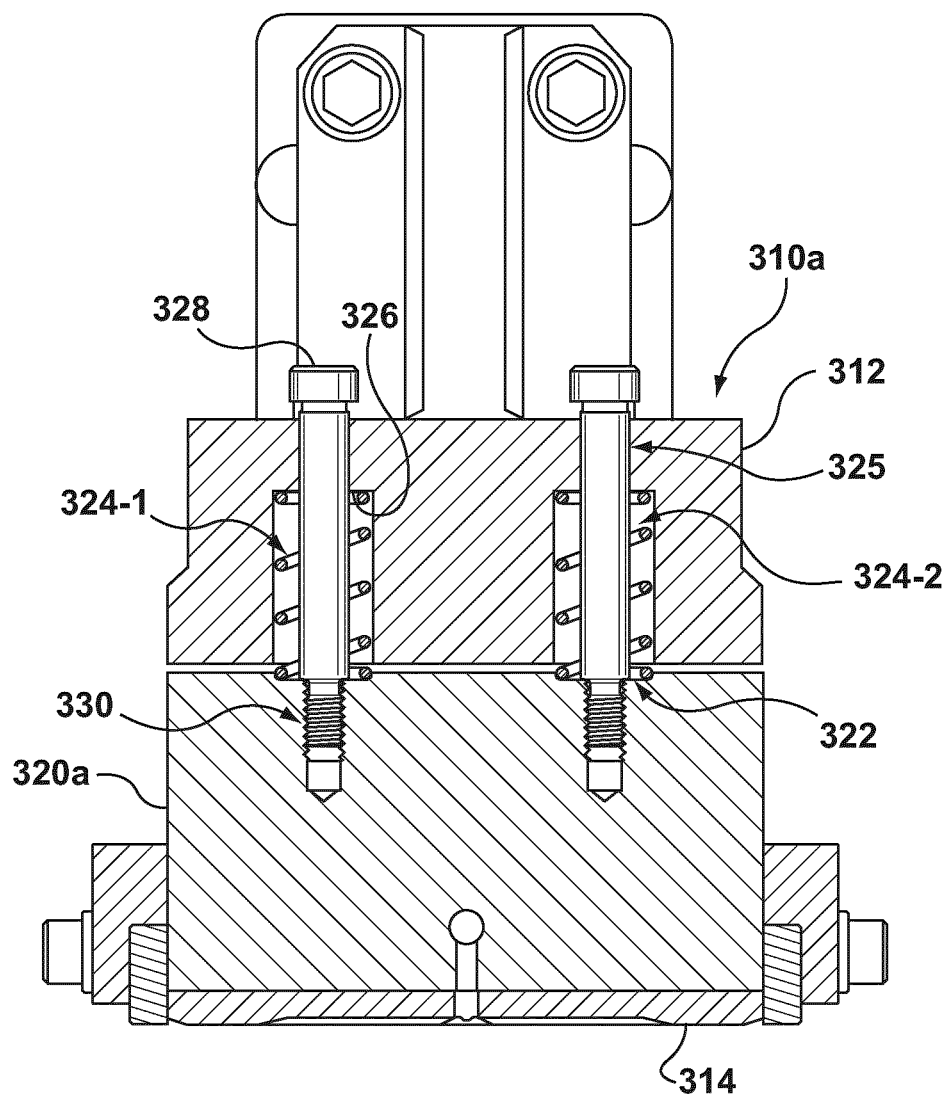
Figure 8:
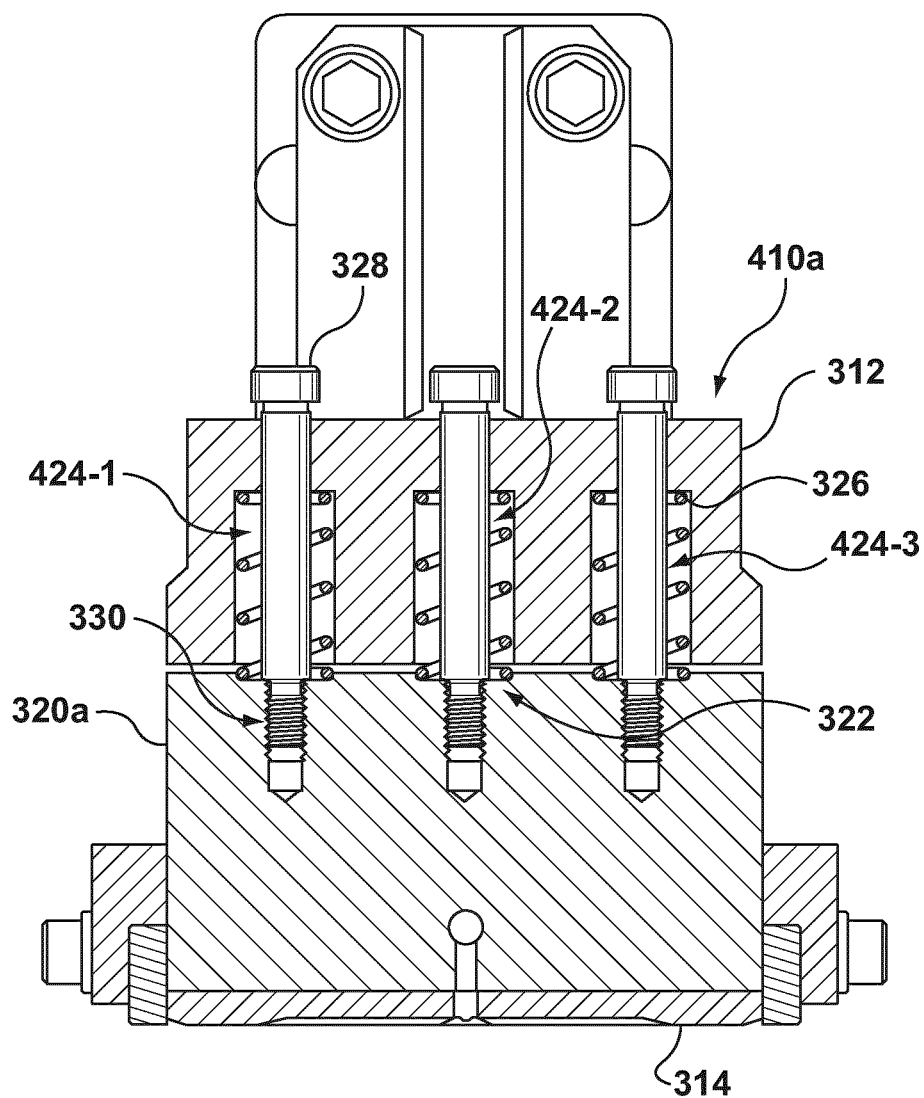
Figure 9:
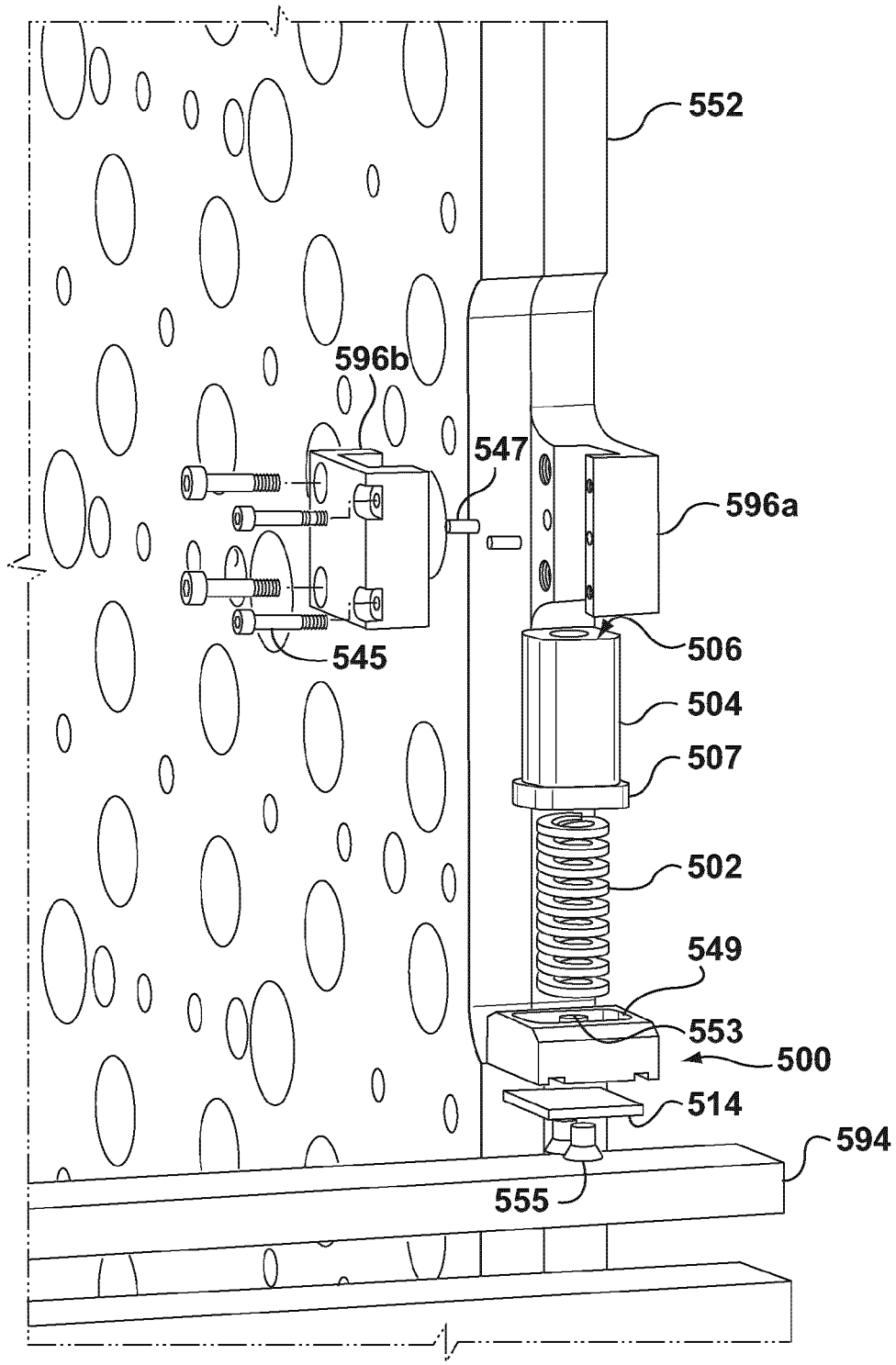
Figure 10:
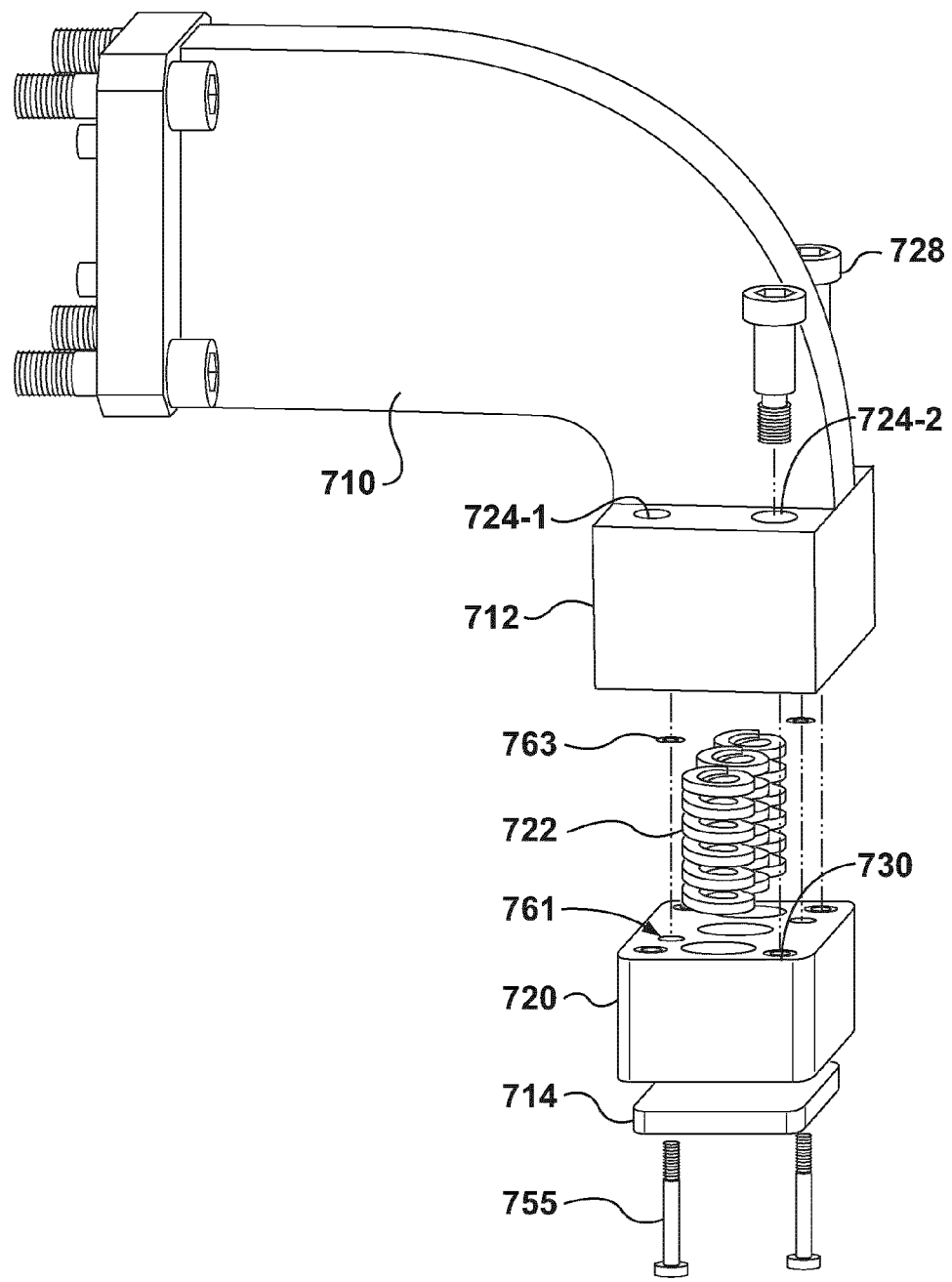
Figure 11:
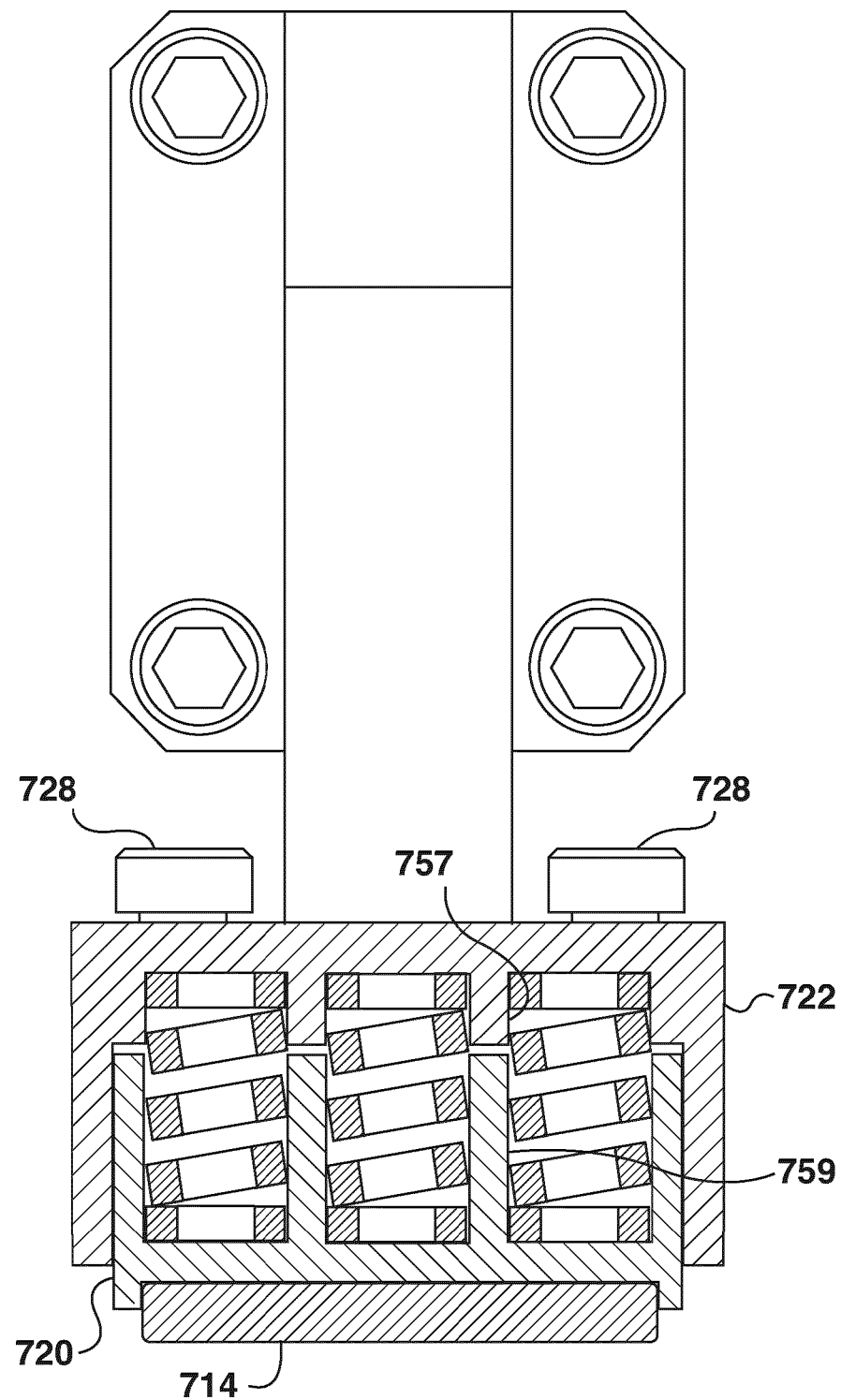

The non-limiting embodiments will be more fully appreciated by reference to the accompanying drawings, in which:

FIG. 1 is a schematic, partially sectioned, longitudinal view of an injection molding machine, FIG. 2 is a schematic cross-sectional view along the lines II-II of FIG. 1, FIG. 3 is a perspective view of an ejector box and cassette in accordance with another embodiment which may be used in the molding machine of FIG. 1, FIG. 4 is a perspective view of a portion of the ejector box of FIG. 3, FIG. 5 is a perspective view of the cassette of FIG. 3, FIG. 6 is a fragmentary cross-sectional view along the lines VI-VI of FIG. 3, FIG. 7 is a fragmentary cross-sectional view along the lines VII-VII of FIG. 3, FIG. 8 is a fragmentary cross-sectional view in accordance with another embodiment, FIG. 9 is a fragmentary exploded view in accordance with another embodiment, FIG. 10 is an exploded view of a portion of an ejector box in accordance with another embodiment, and FIG. 11 is a front view of the portion of the ejector box of FIG. 10.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

Reference will now be made in detail to various non-limiting embodiment(s) of a mold assembly for use in a molding machine. It should be understood that other non-limiting embodiment(s), modifications and equivalents will be evident to one of ordinary skill in the art in view of the non-limiting embodiment(s) disclosed herein and that these variants should be considered to be within scope of the appended claims.

Furthermore, it will be recognized by one of ordinary skill in the art that certain structural and operational details of the non-limiting embodiment(s) discussed hereafter may be modified or omitted (i.e. non-essential) altogether. In other instances, well known methods, procedures, and components have not been described in detail.

Turning to FIG. 1, an injection molding machine 10 has a fixed platen 12 which is fixed to a bed 14 and a moveable platen 16 that rides on rails 18 extending along the top of the bed 14. Tie bars 15 (omitted from FIG. 1 for clarity but seen in FIG. 2) provide further support for the moveable platen. A hot mold half 20 is mounted to the fixed platen 12. The hot mold half 20 has a mold cavity 22 communicating with a sprue 24. As is conventional, the sprue may terminate a runner (not shown) extending from a screw injector (not shown). The hot mold half has leader pin guides 26.

A mold assembly, namely, an ejector box 30 with a cassette 50, is mounted to the moving platen 16. (The distance between the bed 14 and the ejector box 30 and hot mold 20 has been increased in FIG. 1 for clarity of the drawing.) The ejector box has a rear plate 32, front plate 34, and outer walls 38. Leader pins 40 project from the front plate 34 of the ejector box toward the leader pin guides 26 of the hot mold half 20 and rearwardly into bearings of cavities in the walls 38 of the ejector box. Guides 42 extend from the rear plate 32 of the ejector box 30 into bearings 43 in its front plate 34. The cassette 50 is slidably mounted to guides 42 within the ejector box 30 by bearings 51. The cassette has a first plate 52 which holds the inner mold piece 62 of a mold stack 60, a second plate 54 which holds the outer mold piece 64 of the mold stack, and a third plate 56 which holds the stripper sleeve 66 of the mold stack 60. The rear plate 32 of the ejector box 30 slidably supports a locking plate (not shown) that is repositionable between a locking position and an unlocking position. When the locking plate is in the locking position the cassette 50 is held in a molding position within the ejector box 30. In the unlocking position the plates of the cassette 50 are repositionable within the ejector box 30 for performing one or more mold function such as, for example, ejection of the molded article from the mold stack 60. Motion of the plates may be driven by an ejector actuator (not shown) that is associated with the molding machine 10. A more detailed description of the foregoing structure may be referenced in Applicant's PCT application WO 2011/063499(A1) to Halter et al., published on Jun. 3, 2011.

To address misalignments during operation, the mold machine 10 is provided with mechanisms to compensate for the weight of the cassette and of the ejector box. More specifically, turning to FIG. 2, ejector box 30 has a window 90a, 90b in each of its side walls 38a, 38b. A linear way 94a, 94b defines the bottom of each window. Plate 56 of the cassette has a pair of wings 96a, 96b. An outer end 98a of wing 96a extends over linear way 94a and an outer end 98b of wing 96b extends over linear way 94b. A pad 100a is disposed between the outer end 98a of wing 96a and the linear way 94a and a spring 102a is captured between the outer end of the wing and the pad 100a. Similarly, a pad 100b is disposed between the outer end 98b of wing 96b and the linear way 94b and a spring 102b is captured between the outer end of the wing and the pad 100b. The springs 102a, 102b act directly against the force of gravity on plate 56 of the cassette and therefore act to reduce the apparent weight of plate 56 on guides 42. Like mechanisms are provided for other plates 52, 54 of the cassette.

Wings 110a, 110b project from the side walls 38a, 38b of ejector box 30. An outer end 112a of wing 110a extends over a linear way 114a of bed rail 14a and an outer end 112b of wing 110b extends over linear way 114b of bed rail 14b. A pad 120a is disposed between the outer end 112a of wing 110a and the linear way 114a and a spring 122a is captured between the outer end of the wing 110a and the pad 120a. Similarly, a pad 120b is disposed between the outer end 112b of wing 110b and the linear way 114b and a spring 122b is captured between the outer end of the wing and the pad 120b. A brass wear pad 124a, 124b lines the top of respective linear ways 114a, 114b. The springs 122a, 122b act directly against the force of gravity on the ejector box 30 and therefore act to reduce the apparent cantilevered torque of the ejector box on moveable platen 16.

Another example ejector box is illustrated in FIGS. 3 to 5. Turning to these figures, ejector box 130 has a rear plate 132 and front plate 134 bridged by guides 142 on which a cassette 150 is supported. Leader pins 140 project from the front plate 134. The cassette has plates 152-1, 152-2, 152-3, and 152-4, each of which holds one piece of multiple mold stacks 160 (two of which are illustrated).

The rear plate 132 of the ejector box 130 slidably supports a locking plate 166 for side-to-side movement between a locking position and an unlocking position. The locking plate has a set of locking members 168 and a control bar 167 which is used to position the locking plate. When the locking members 168 are in the locking position the locking members 168 cooperate with complementary structure on the plates 152-1 to 152-4 to hold the cassette 150 in a molding position within the ejector box 130. In the unlocking position (not shown) the plates of the cassette 150 are repositionable within the ejector box 130 for performing one or more mold function such as, for example, ejection of the molded articles from the mold stacks 160. Motion of the plates may be driven by an ejector actuator (not shown) that is associated with the molding machine 10 via ejector rods 172-1, 172-2, 172-3 that push against the plates 152-1 to 152-4. Again, a more detailed description of the foregoing structure may be referenced in Applicant's PCT application WO 2011/063499(A1) to Halter et al., published on Jun. 3, 2011.

Ejector box 130 has a window 190a, 190b in each of its side walls 138a, 138b. A linear way 194a, 194b defines the bottom of each window. Plate 152-1 of the cassette has a pair of wings 196-1. An outer end of each wing 196-1 extends over one of linear ways 194a and 194b. A pad 200-1 is disposed between the outer end of each wing 196-1 and the underlying linear way 194a or 194b.

Turning to FIG. 6, each wing 196-1 defines an annular cavity 199 which is open at either end and receives a shouldered annular spring container 204-1 in which a spring 202 is contained. Pad 200-1 abuts the base of the spring container such that the spring 202 is captured between the upper shoulders 206 of the spring container and the pad 200-1. The pad has upstanding arms 212f, 212r which extend along the front 214f and rear 214r surfaces of the outer end of wing 196-1. In consequence, the wing surfaces 214f and 214r act as a key and the front and rear surfaces of the upstanding arms 212f and 212r of the pad act as a keyway so that the pad 200-1 is constrained to move along the linear way 194a with the wing 196-1 yet the wing is free to move up independently of the pad.

Similarly, cassette plates 152-2, 152-3, 152-4 have wings 196-2, 196-3, 196-4 with annular cavities 199 receiving spring containers 204-2, 204-3, 204-4. Springs 202 are also captured between these spring containers and respective pads 200-2, 200-3, 200-4.

The springs 202 act directly against the force of gravity on the plates 152-1, 152-2, 152-3, 152-4 of the cassette and therefore act to reduce the apparent weight of the plates on the guides 142. Notably, the spring constant (stiffness) of the springs 202 and the height of the lower shoulders 207 of the spring containers 204-1, 204-2, 204-3, 204-4 may be selected based on the weight of the plates 152-1, 152-2, 152-3, 152-4 so that the weight of the plates is balanced as desired.

To facilitate installation, a 208 washer is placed on top of each spring containers 204-1, 204-2, 204-3, 204-4 and a screw 210 is inserted through each spring container and threaded into a threaded bore of each pad 200-1 to 200-4. These screws hold the spring assemblies together as the plates 152-1, 152-2, 152-3, 152-4 are set in place on the linear way 194a. Once the plates are in place, the screws 210 and washers 208 are removed.

Turning to FIGS. 3, 4, and 7 wings 310a, 310b project from the side walls 138a, 138b of ejector box 130.

An outer end 312 of wing 310a extends over a linear way (not shown) of a bed rail (not shown) and an outer end of wing 310b extends over a linear way (not shown) of a bed rail (not shown). A pad 320a is disposed between the outer end 312 of wing 310a and the linear way below it and a spring 322 is captured between the outer end of the wing 310a and the pad 320a. Similarly, a pad 320b is disposed between the outer end 312b of wing 310b and the linear way below it and a spring is captured between the outer end of the wing and the pad 320b.

With specific reference to FIG. 7, a wear pad 314 is attached to the bottom of each pad 320a. The outer end 312 of wing 310a has two open ended shouldered annular cavities 324-1, 324-2. A spring 322 is disposed in each such cavity and trapped between the shoulders 326 of the cavity and the underlying pad 320a. A stroke limiting pin 328 with a threaded tip extends through the upper opening 325 of each annular cavity and is threaded to threaded bore 330 in the pad 320a such that, with pad 320a abutting the outer end 312 of wing 310a, the head of the pin is at a stand-off from the top surface of the wing. Each pin acts as a key and the upper opening 325 through which it extends acts as a keyway to permit the wing 310a to lift away from the underlying pad (up to the point where the upper surface of the wing abuts the head of the pin) but constraining the pad to move along the underlying linear way with the wing. The outer end of wing 310b is identically configured.

The springs 322 act directly against the force of gravity on the ejector box 130 and therefore act to reduce the apparent cantilevered torque of the ejector box when mounted to a moveable platen. Again, the force applied by the springs may be selected by choosing the spring constant and the depth of shoulders 326 of the spring cavities.

Although FIG. 7 shows two spring cavities, a greater, or lesser, number of spring cavities and springs could be provided. For example, with reference to FIG. 8, wherein like parts to those of FIG. 7 have been given like reference numerals, the outer end of wing 410a has three open ended shouldered annular cavities 424-1, 424-2, 424-3 with a spring 322 is disposed in each such cavity and trapped between the shoulders 326 of the cavity and the underlying pad 320a.

Turning to FIG. 9, in another embodiment of a spring assembly for the ejector plates, each plate 552 of the ejector box has a wing half 596a projecting therefrom to which a second wing half 596b attaches by means of screws 545 and dowels 547 to form an open ended wing. The wing receives a shouldered annular spring container 504 such that the lower shoulder 507 of the spring container abuts the bottom of the wing. A spring 502 is contained within the spring container. A pad 500 abuts the base of the spring container such that the spring 502 is captured between the upper shoulder 506 of the spring container and the pad. The pad has a central well 549 sized to receive and closely fit to the lower shoulder 507 of the spring container. The pad 500 also has an upwardly projecting peg 553 which assists in locating the spring 502. A wear plate 514 is attached by screws 555 to the pad 500. The lower shoulder 507 of the spring container acts as a key and the central well 549 of the pad 500 as a keyway such that, in operation, the pad is constrained to move with the wing along the linear way 594 yet the wing is free to move vertically relative to the pad.

FIGS. 10 and 11 show another embodiment of the spring assemblies for the ejector box. Turning to FIGS. 10 and 11, springs 722 are captured between an outer end 712 of wing 710 and pad 720. More specifically, the outer end 712 of the wing is an inverted cup-shape with internal walls 757 forming spring locating wells. These match spring locating wells formed by walls 759 of the pad 720 so that the wells of the wing end and pad form spring containers. The outer end 712 of wing 710 has two bores 724-1, 724-2. A stroke limiting pin 728 with a threaded tip extends through each bore and is threaded to a threaded bore 730 in the pad 720 such that, with pad 720 abutting the outer end 712 of wing 710, the head of the pin 728 is at a stand-off from the top surface of the wing. Each pin 728 acts as a key and the bore through which it extends acts as a keyway to permit the wing 710 to lift away from the underlying pad (up to the point where the upper surface of the wing abuts the head of the pin) but constraining the pad to move along an underlying linear way. The top surface of the pad 720 has two indentations 761 which receive C-clips 763. A wear pad 714 is attached to the bottom of pad 720 by screws 755 which pass through the wear pad and pad 720 and are retained by the C-clips.

It would be possible to replace the springs with another force generator to apply an upward force on the wings of the cassette plates and the ejector box. For example, it would be possible to utilize air cylinders in place of the springs. With this substitution, the magnitude of the upward force could be adjusted by adjusting the air pressure in the cylinders.

The approach described to compensate for the weight of cassette plates and an ejector box can be used with other suspended components and in different types of mold machines.

It is noted that the foregoing has outlined some of the more pertinent non-limiting embodiments. It will be clear to those skilled in the art that modifications to the disclosed non-embodiment(s) can be effected without departing from the spirit and scope thereof. As such, the described non-limiting embodiment(s) ought to be considered to be merely illustrative of some of the more prominent features and applications. Other beneficial results can be realized by applying the non-limiting embodiments in a different manner or modifying them in ways known to those familiar with the art. This includes the mixing and matching of features, elements and/or functions between various non-limiting embodiment(s) is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

What is claimed is:

1. A mold assembly for use in a molding machine comprising:
    an ejector box having a plurality of guides, said ejector box defining at least one ejector box linear way;
    a cassette having at least one cassette plate extending within said ejector box and supported on said guides, each cassette plate for supporting a mold piece, each cassette plate having at least one cassette plate support member extending over one said ejector box linear way;
    at least one pad riding on each said ejector box linear way such that there is a pad below each cassette plate support member; and
    a force generator disposed between said cassette plate support member and said pad below said cassette plate support member.

2. The mold assembly of claim 1 wherein said at least one ejector box linear way comprises a first ejector box linear way at a first side of said ejector box and a second ejector box linear way at a second side of said ejector box and wherein said at least one cassette plate support member comprises a pair of wings projecting from opposed sides of said each cassette plate.

3. The mold assembly of claim 2 wherein each said force generator is a spring.

4. The mold assembly of claim 3 wherein an outer end of each wing of said pair of wings defines a spring cavity for receiving one said spring.

5. The mold assembly of claim 4 wherein one of said outer end of each wing and each pad below said outer end of each wing defines a key and another of said outer end of each wing and said pad below said outer end of each wing defines a keyway such that any given wing is free to move toward and away from a given pad below said given wing and said given pad is constrained to move along said linear way with said given wing.

6. The mold assembly of claim 5 wherein said key comprises outer faces of said outer end of said wing and said keyway comprises upstanding arms of each said pad.

7. The mold assembly of claim 2 wherein said ejector box has a pair of ejector box wings with at least one spring cavity at an outer end of each of said ejector box wings.

8. A molding machine comprising:
    a bed having a first linear way and a second linear way;
    a moveable platen moveably supported on said bed;
    a fixed platen fixed to said bed;
    an ejector box affixed to said moveable platen, said ejector box having a first wing and an opposed second wing;
    a first pad riding on said first linear way and a second pad riding on said second linear way;
    an outer end of said first wing disposed above said first pad and an outer end of said second wing disposed above said second pad;
    at least one spring disposed between said outer end of said first wing and said first pad and at least one spring disposed between said outer end of said second wing and said second pad;
    one of said outer end of said first wing and said first pad providing a key and another of said outer end of said first wing and said first pad providing a keyway so that said first wing may move upwardly away from first pad and said first pad is constrained to move along said first linear way with said first wing;
    one of said outer end of said second wing and said second pad providing a key and another of said outer end of said second wing and said second pad providing a keyway so that said second wing may move upwardly away from second pad and said second pad is constrained to move along said second linear way with said second wing.

9. The molding machine of claim 8 wherein said outer end of said first wing comprises at least one first wing cavity, each of said at least one first wing cavity for containing one spring and wherein said outer end of said second wing comprises at least one second wing cavity, each of said at least one second wing cavity for containing one spring.

10. The molding machine of claim 9 wherein one said keyway comprises a bore in said first pad and one said key comprises a pin extending through said first wing cavity and into said bore of said first pad.

11. A molding machine comprising:
    a suspended component having a first wing and an opposed second wing projecting outwardly from opposed sides of said suspended component;
    a first linear way provided below said first wing;
    a second linear way provided below said second wing;
    a first pad slidably received on said first linear way below said first wing;
    a second pad slidably received on said second linear way below said second wing;
    a force generator disposed between said first wing and said first pad; and
    a force generator disposed between said second wing and said second pad.

12. The molding machine of claim 11 wherein:
    said suspended component is a first suspended component and said first suspended component has a first suspended component first linear way and a first suspended component second linear way and further comprising:
    a second suspended component having a second suspended component first wing and an opposed second suspended component second wing projecting outwardly from opposed sides of said second suspended component over respective ones of said first suspended component first linear way and said first suspended component second linear way;
    a third pad slidably received on said first suspended component first linear way below said second suspended component first wing;
    a fourth pad slidably received on said first suspended component second linear way below said second suspended component second wing;
    a force generator disposed between said second suspended component first wing and said third pad; and a force generator disposed between said second suspended component second wing and said fourth pad.

13. The molding machine of claim 11 wherein one of said first wing and said first pad defines a key and another of said first wing and said first pad defines a keyway such that said first wing is free to move toward and away from said first pad and said first pad is constrained to move along said first linear way with said first wing.

14. The molding machine of claim 12 wherein each said force generator is a spring.

15. The mold machine of claim 14 wherein said first wing defines a spring cavity for receiving one said spring and wherein said second wing defines a spring cavity for receiving one said spring.

16. The mold machine of claim 13 wherein said key comprises outer faces of said first wing and said keyway comprises upstanding arms of said first pad.

* * * * *